(12) United States Patent
Duffy et al.

(10) Patent No.: US 7,469,181 B2
(45) Date of Patent: Dec. 23, 2008

(54) HIGH LOAD OPERATION IN A HOMOGENEOUS CHARGE COMPRESSION IGNITION ENGINE

(75) Inventors: Kevin P. Duffy, Metamora, IL (US); Andrew J. Kieser, Morton, IL (US); Michael P. Liechty, Chillicothe, IL (US); William L. Hardy, Peoria, IL (US); Anthony Rodman, Chillicothe, IL (US); Carl-Anders Hergart, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 11/699,523

(22) Filed: Jan. 29, 2007

(65) Prior Publication Data

US 2008/0178848 A1 Jul. 31, 2008

(51) Int. Cl.
*G06F 19/00* (2006.01)
*F02M 25/07* (2006.01)
*F02B 47/08* (2006.01)
*F02B 75/04* (2006.01)
*F02B 33/44* (2006.01)

(52) U.S. Cl. .............. 701/108; 123/305; 123/316; 123/568.14; 123/568.21; 701/115; 60/605.2

(58) Field of Classification Search ............... 123/295, 123/305, 316, 90.15–90.18, 568.11, 568.12, 123/568.14, 568.21, 435; 701/101–103, 701/108, 110, 115; 60/605.2
See application file for complete search history.

(56) References Cited

U.S. PATENT DOCUMENTS

| | | | |
|---|---|---|---|
| 6,230,683 B1 | 5/2001 | Zur Loye et al. | |
| 6,390,054 B1 * | 5/2002 | Yang | 123/305 |
| 6,561,157 B2 * | 5/2003 | zur Loye et al. | 123/305 |
| 6,640,773 B2 * | 11/2003 | Ancimer et al. | 123/299 |
| 6,668,789 B1 | 12/2003 | Marriott et al. | |
| 6,684,852 B2 | 2/2004 | Wright et al. | |
| 6,755,022 B2 * | 6/2004 | Kim et al. | 60/608 |
| 6,843,231 B1 | 1/2005 | Duffy et al. | |
| 6,912,992 B2 * | 7/2005 | Ancimer et al. | 123/299 |
| 6,951,211 B2 * | 10/2005 | Bryant | 123/316 |
| 6,968,831 B2 * | 11/2005 | Kim et al. | 123/568.11 |
| 6,999,866 B2 * | 2/2006 | Noda | 701/111 |
| 7,036,482 B2 | 5/2006 | Beck et al. | |
| 7,168,420 B1 * | 1/2007 | Yang | 123/295 |
| 2003/0116124 A1 | 6/2003 | Lawrence et al. | |
| 2006/0112911 A1 | 6/2006 | Lawrence et al. | |
| 2006/0112928 A1 | 6/2006 | Coleman et al. | |
| 2007/0193270 A1 * | 8/2007 | Roozenboom et al. | 60/605.2 |

* cited by examiner

*Primary Examiner*—Willis R Wolfe, Jr.
(74) *Attorney, Agent, or Firm*—Liell & McNeil

(57) ABSTRACT

A homogeneous charge compression ignition engine is set up by first identifying combinations of compression ratio and exhaust gas percentages for each speed and load across the engines operating range. These identified ratios and exhaust gas percentages can then be converted into geometric compression ratio controller settings and exhaust gas recirculation rate controller settings that are mapped against speed and load, and made available to the electronic engine controller. This provides the engine controller with a look up table of what compression ratio and exhaust gas rates should be at each speed and load. The engine controller also balances at least one of combustion phasing and energy release among a plurality of cylinders in order to enable higher load operation.

20 Claims, 6 Drawing Sheets

HIGH LOAD OPERATION IN A HOMOGENEOUS CHARGE COMPRESSION IGNITION ENGINE

This invention was made with Government support under DOE Contract No. DE-FC26-05NT4 2412 awarded by the U.S. Department of Energy. The Government has certain rights to this invention.

TECHNICAL FIELD

This disclosure relates generally to homogeneous charge compression ignition (HCCI) engines, and more particularly to a strategy and structure for operating an HCCI engine in a high load range.

BACKGROUND

A relatively new combustion strategy known as homogeneous charge compression ignition shows great promise in reducing undesirable emissions from internal combustion engines that utilize a compression ignition strategy. HCCI refers generally to the idea of mixing fuel with air in the engine cylinder before autoignition conditions arise. The mixture is compressed to autoignition, with a general desirability that the combustion event take place in the vicinity of top dead center. Although HCCI has proven the ability to drastically reduce undesirable emissions, especially NOx, the combustion strategy has brought new problems that must be overcome in order to render such an engine commercially viable. For instance, for an HCCI engine to be a viable alternative to a counterpart diesel engine, it must have the ability to operate effectively over a relatively wide load range. One problem encountered with HCCI engines is the extreme sensitivity and difficulty in controlling ignition timing. In addition, HCCI engines can have difficulty in operating in higher load ranges where more fuel is supplied to the individual cylinder. This perceived limitation may be due to extreme pressure spikes that occur when the charge burns. The pressures can get so high as to exceed the structural containment capability of an engine housing. In addition, extreme pressure rise rates can also limit a load range for an HCCI engine due to extreme vibrations. Thus, controlling an HCCI engine, especially at higher speeds and loads, can be extremely problematic, but must be overcome to enable such an engine to be a viable alternative to a counterpart diesel engine.

Apart from those problems identified in the previous paragraph, multi-cylinder HCCI engines have even more problems that need to be overcome. For instance, engine geometry, including the intake geometry, fuel injector performance variations, and other known and unknown influences affect the specific burn behavior of charges in different ones of a plurality of engine cylinders. For instance, intake manifold geometry may result in one cylinder receiving less or more air than other cylinders, and a fuel injector performance variation in another cylinder may cause less or more fuel to be injected based upon the same control signal. These differences result in different air fuel ratios in different cylinders. Homogeneous charge combustion is very sensitive to air fuel ratio and other factors. Thus, these variations can contribute to substantial differences in both energy release and combustion phase timing among a plurality of different engine cylinders. While some variation may be more acceptable at lower load conditions, at higher speeds and loads, combustion phasing and energy release variation among the plurality of cylinders can give rise to unacceptable vibration and noise levels. In addition, the cylinder with the most advanced combustion will develop a maximum pressure at a lower load, and therefore will limit peak load of the entire engine. Those skilled in the art will appreciate that, when the charge burns too early in the combustion stroke, excessive cylinder pressures and pressure rise rates can occur that limit the load carrying capability of that cylinder, and hence the entire engine.

One strategy for dealing with the problems of HCCI is described in co-owned U.S. Pat. No. 6,725,838. This reference describes a mixed mode strategy where HCCI is employed over a lower load range portion of the engine, and conventional diesel engine strategies are employed at high speeds and loads. By conventional, this disclosure means that fuel is injected directly into an engine cylinder after autoignition conditions have arisen, with the injection taking place in the vicinity of top dead center. While a mixed mode strategy can produce superior emissions compared to that of a conventional diesel engine, it requires increased complexity, especially in manufacturing and controlling the fuel system, but mixed mode still results in more undesirable emissions than that possible with an entirely HCCI operation strategy.

The present disclosure is directed toward one or more of the problems set forth above.

SUMMARY OF THE INVENTION

In one aspect, a method of operating an engine includes compressing a mixture of fuel, exhaust gas and air in a combustion chamber to an auto ignition condition of the fuel. An exhaust gas recirculation rate is set sufficient to achieve a NOx level. A geometric compression ratio is set corresponding to a desired combustion phasing, given the exhaust gas return rate setting. Different gas exchange valve timing control settings are made among a plurality of combustion chambers.

In another aspect, a homogenous charge compression ignition engine includes an engine housing having at least one combustion chamber disposed therein. An exhaust gas recirculation rate control system has a range of settings sufficient to achieve a NOx level at each engine operating condition. A geometric compression ratio control system has a range of settings for each engine operating condition. A gas exchange valve timing controller is associated with each combustion chamber. An electronic engine controller is linked to a map of exhaust gas recirculation rate controller settings for each speed and load across the operating range. The electronic engine controller is also linked to a map of geometric compression ratio control settings for each speed and load across the operating range.

In still another aspect, a method of setting up a homogeneous charge compression ignition engine includes identifying a combination of compression ratio and exhaust gas percentage that satisfy a pressure rise rate limit and a peak cylinder pressure limit. This identifying step is performed across an engine operating range at a plurality of combinations of speed and load. The identified combinations of compression ratio and exhaust gas percentage are mapped to combinations of speed and load. The mapping is stored on a medium linked to an electronic engine controller.

DETAILED DESCRIPTION

Figure 1:
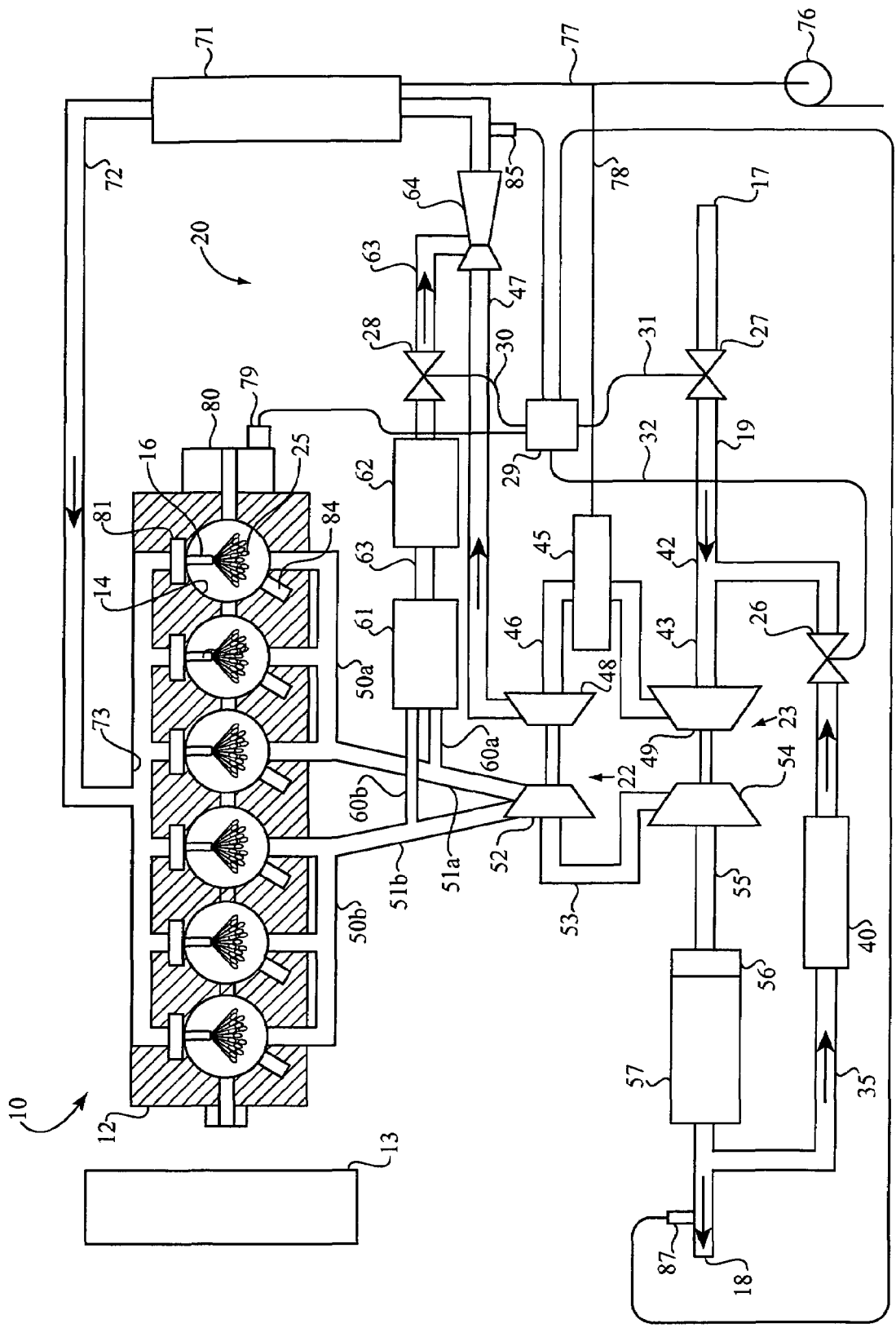
FIG. 1 is a schematic illustration of a homogeneous charge compression ignition engine according to one aspect of the present disclosure.

Referring to FIG. 1, a homogeneous charge compression ignition engine 10 includes an engine housing 12 that includes a plurality of cylinders or combustion chambers 14 disposed therein. In the illustrated embodiment, engine 10 includes six cylinders 14, but those skilled in the art will appreciate that engine 10 could include any number of cylinders without departing from the present disclosure. Engine 10 includes a conventional radiator 13 along with a cooling system (not shown) to cool the engine in a conventional manner. Each cylinder 14 preferably includes a fuel injector 16 positioned for direct injection of liquid fuel into the individual cylinders. Furthermore, each fuel injector may include a nozzle tip configured to produce a shower head spray pattern 25 in which fuel injection plumes point at a plurality of different angles with respect to a fuel injector centerline. Furthermore, the fuel injection holes may be constructed using known laser drilling techniques to achieve extremely small diameter openings, which may be on the order of 80-100 microns. Those skilled in the art will appreciate that the small holed shower head spray pattern can facilitate better fuel and air mixing, and possibly permit lower injection pressures without wetting the walls of cylinder 14, which could produce undesirable unburnt hydrocarbon emissions and/or particulate matter.

Engine 10 may also be equipped with a geometric variable compression ratio control device 80 that allows for the geometric compression ratio of all cylinders 14 to be adjusted simultaneously. Although the variable geometric compression ratio control device 80 could take on a variety of forms, it may have a structure similar to that described in co-owned published United States Patent Application 2006/0112911. In that disclosure, an eccentric crank variable compression ratio mechanism raises and/or lowers the crankshaft in the engine housing to alter the compression ratio of all of the cylinders uniformly. Nevertheless, those skilled in the art will appreciate that any appropriate strategy for varying compression ratio may be considered appropriate for an engine 10 according to the present disclosure. Although not necessary, a feedback variable geometric compression ratio sensor 79 may be utilized to sense the configuration of the geometric variable compression ratio control device 80. This may allow the engine controller 29 to sense and adjust the position of geometric variable compression ratio control device 80 in the event that open loop control signals are insufficient to confirm a precise geometric compression ratio control setting. Those skilled in the art will appreciate that having the ability to vary geometric compression ratio can render the problem of combustion control timing, and the problems associated with extremely high pressures and pressure rise rates during combustion, more manageable over a broader range of speeds and loads than with a fixed compression ratio engine.

Engine 10 may also be constructed to include variable intake valve actuators 81 as an alternative, or in addition to, the variable compression ratio device 80. Those skilled in the art will appreciate that the variable intake valve actuator can also take on a variety of forms, such as purely electronically controlled, or a hybrid that uses cam actuation and a special hydraulic actuator to hold the intake valve open beyond a cam dictated valve closing timing. The later alternative is described, for instance, in co-owned published U.S. Patent Application 2003/0116124. This variable timing capability can also be exploited to adjust compression ratio in the individual cylinders by adjusting the timing at which the intake valve closes. In addition, variable valve timing affects combustion phasing by adjusting the charge mass in the cylinder, apart from compression ratio. Engine 10 may also be equipped with variable exhaust valves (not shown) as an alternative, or in addition, to the variable intake valve actuators 81. Unlike the geometric compression ratio device 80, each individual cylinder includes an individually controllable variable intake valve actuator 81, which allows the behavior of each cylinder 14 to be individually controlled. Preferably, engine 10 is equipped with both a geometric compression ratio device 80 and variable intake valve actuators 81 that allow en banc adjustments of all cylinders 14 via the geometric compression ratio device 80, and then finer and faster control of combustion phasing individual cylinders 14 via the variable intake valve actuators 81.

Engine 10 may also be equipped with some means for detecting the timing of combustion events in each individual cylinder 14 so that combustion information can be fed back to the engine controller 29, which may then use that information to adjust combustion timing for a subsequent event. In the illustrated embodiment, an individual combustion pressure sensor or an ion sensor 84 is associated with each of the individual cylinders 14. Nevertheless, those skilled in the art will appreciate that any single or multiple sensor strategy that permits the timing, and maybe rates, of combustion events in each of the cylinders 14 to be determined in real time would be suitable for engine 10 of the present disclosure, and may be desirable to better enable closed loop combustion timing control.

Engine 10 also includes a fresh air inlet 17, a tail pipe 18 and an exhaust gas recirculation system 20. A combination of fresh air and exhaust gas are supplied to engine intake manifold 73 via an engine intake passage 72, which is separated from an air/exhaust gas passage 70 by an air-to-air aftercooler 71. Those skilled in the art will appreciate that cooler 71 may include measures, such as being made at least partially from stainless steel, to resist the corrosive influences of exhaust gas passing therethrough. In addition, cooler 71 may include any suitable heat exchanger, such as liquid to gas, etc. Exhaust from the individual cylinders 14 collects in first and second exhaust manifolds 50a and 50b, which are respectively connected to exhaust passages 51a and 51b. Nevertheless, those skilled in the art will appreciate that a single exhaust manifold and exhaust passage could be utilized without departing from the scope of the present disclosure. The exhaust passages 51a and 51b feed into a turbine 52 of a turbocharger 22 in a conventional manner. However, a portion of the exhaust that would otherwise go to turbine 52 is instead routed into branch recirculation passages 60a and 60b, which merge in the vicinity of a coated diesel particulate filter 61. Those skilled in the art will appreciate that particulate filter 61 may be coated with any suitable catalyst for any desired purpose, such as to clean the high pressure exhaust being recirculated via these passages. In addition, those skilled in the art will appreciate that particulate filter 61 is preferably positioned in close enough proximity to cylinders 14 so that it can be regenerated via heat supplied by the engine. Alternatively, a separate auxiliary regeneration device, which produces its own heat, may be positioned in close proximity to particulate filter 61 to facilitate its regeneration. After passing through particulate filter 61, the high pressure exhaust passes through a clean gas intake cooler 62 and a control valve 28 before connecting to the throat of a venturi 64, which empties into air/exhaust gas return passage 70. Control valve 28 may take on a variety of forms, but may be a relatively simple two-position valve that is never fully closed. For instance, the flow area through control valve 28 in its first position may be chosen to facilitate a desired exhaust gas recirculation level associated with low load or idle positions, and a second or more fully open position may be associated with higher speeds and loads to facilitate higher volumes of exhaust gas recirculation. Nevertheless, control valve 28 may have more than two positions, and may even include a fully closed position, if desired. Control valve 28 is controlled by an electronic engine controller 29 via a communication line 30 in a conventional manner.

Medium pressure exhaust gas leaves an axial passage from turbine 52 into an inter turbine passage 53, which connects to a turbine 54 of a second turbocharger 23, which is in series with turbocharger 52. Turbine 54 may be an axial turbine, and its lower pressure axial outlet empties into turbine outlet 55. Before arriving at tail pipe 18, the relatively low pressure exhaust is passed through a coated diesel particulate filter 57, which may include any suitable catalyst to treat the exhaust prior to exiting tail pipe 18. Because particulate filter 57 may be relatively remote from the heat of the individual cylinders 14, an auxiliary regeneration device 56 may be included in order to provide the heat necessary to regenerate particulate filter 57. After exiting particulate filter 57, a portion, which may be all of the exhaust gas, exits at tail pipe 18. However, a portion of that low pressure exhaust may be recirculated via low pressure exhaust passage 35. The low pressure exhaust gas is cooled in a clean gas intake cooler 40 prior to encountering a control valve 26. Control valve 26 may have a plurality of discrete positions, or may have a complete continuum of positions from a fully closed to a fully opened position, depending upon the desired action and sophistication of the exhaust gas recirculation system 20. Control valve 26 may be controlled by electronic engine controller 29 via communication line 32.

Fresh air entering fresh air inlet 17 passes through a throttle control valve 27 prior to entry into a fresh air supply passage 19, which merges with low pressure exhaust passage 35 at a tee connection 42. Throttle control valve 27 is controlled in its positioning by electronic engine controller 29 via a communication line 31. Those skilled in the art will appreciate that throttle control valve 27 may have a continuum of positions ranging from a restricted fully throttled position that still allows some fresh air to enter the system, to an unrestricted fully open position. The mixture of low pressure exhaust gas and fresh air is supplied to compressor 49 of turbocharger 23 via compressor supply passage 43. Those skilled in the art will appreciate that compressor 49 may include measures, such as use of corrosion resistant titanium, to deal with the corrosive influence, if any, existing in the exhaust gas passing through the compressor. An inter compressor passage 46 connects compressor 49 to compressor 48 of turbocharger 22. An inter cooler 45 may be included in inter compressor passage 46 to cool the compressed exhaust/air mixture. In addition, cooler 45 may include corrosion resistant materials, such as stainless steel, to avoid or reduce the corrosive influences, if any, of the exhaust gas. Like compressor 49, compressor 48 may include corrosive resistant materials such as titanium, to reduce or avoid corrosive influences from the exhaust gas.

A air/exhaust mixture passage 47 fluidly connects the outlet of compressor 48 to the inlet of venturi 64. Thus, venturi 64 represents the mixing location for exhaust from the high pressure side of the exhaust gas recirculation system 20 with low pressure exhaust that originated near the tail pipe 18, but has had its pressure boosted as a result of passing through compressors 48 and 49.

If desired, coolers 45 and 71 may be connected to a condensate pump 76 via respective condensate passages 78 and 77, to facilitate removal of collected condensed water and other possibly corrosive liquids in coolers 45 and 71 in a conventional manner. Although not necessary, engine 10 may also include one or more NOx/lambda sensors 85 and 87 at specific locations in order to allow for gas constituent levels to be monitored during operation of engine 10. In particular, the lambda sensor 85 may monitor the contents of several different gases in air/exhaust gas return passage 70, and this information may be used to further facilitate combustion control of combustion events in the individual cylinders 14. In particular, sensor 85 may allow electronic engine controller 29 to determine and monitor a percentage of exhaust to fresh air being supplied to each cylinder 14. In addition, this information may enable the engine controller 29 to determine and monitor the mass percentages of fuel, exhaust gas and fresh air in each cylinder when the information from lambda sensors 85 and 87 is combined with fuel injection quantity information. Thus, lambda sensors 85 and 87 may permit feedback control of the EGR system 20 so that Exhaust gas percentage can be continuously controlled to a desired level.

Although engine 10 is illustrated as including staged turbochargers 22 and 23, those skilled in the art will appreciate that the engine could include a single turbocharger without departing from the scope of the present disclosure. In such a case, the high pressure exhaust return could connect upstream from the turbocharger, whereas the low pressure exhaust gas return would connect downstream from the same. Those skilled in the art will appreciate that the relative proportions of exhaust gas to fresh air are controlled by electronic engine controller 29 by appropriately positioning control valves 26, 27 and 28. When the relatively high proportions of EGR are demanded, such as at high loads, which may be on the order of 50% or more, electronic engine controller 29 throttles control valve 27 to restrict the supply of fresh air, and moves valves 26 and 28 towards their fully opened positions to enable the higher ratios of exhaust gas recirculation associated with desired operating conditions at higher speeds and loads for engine 10.

Figure 2:
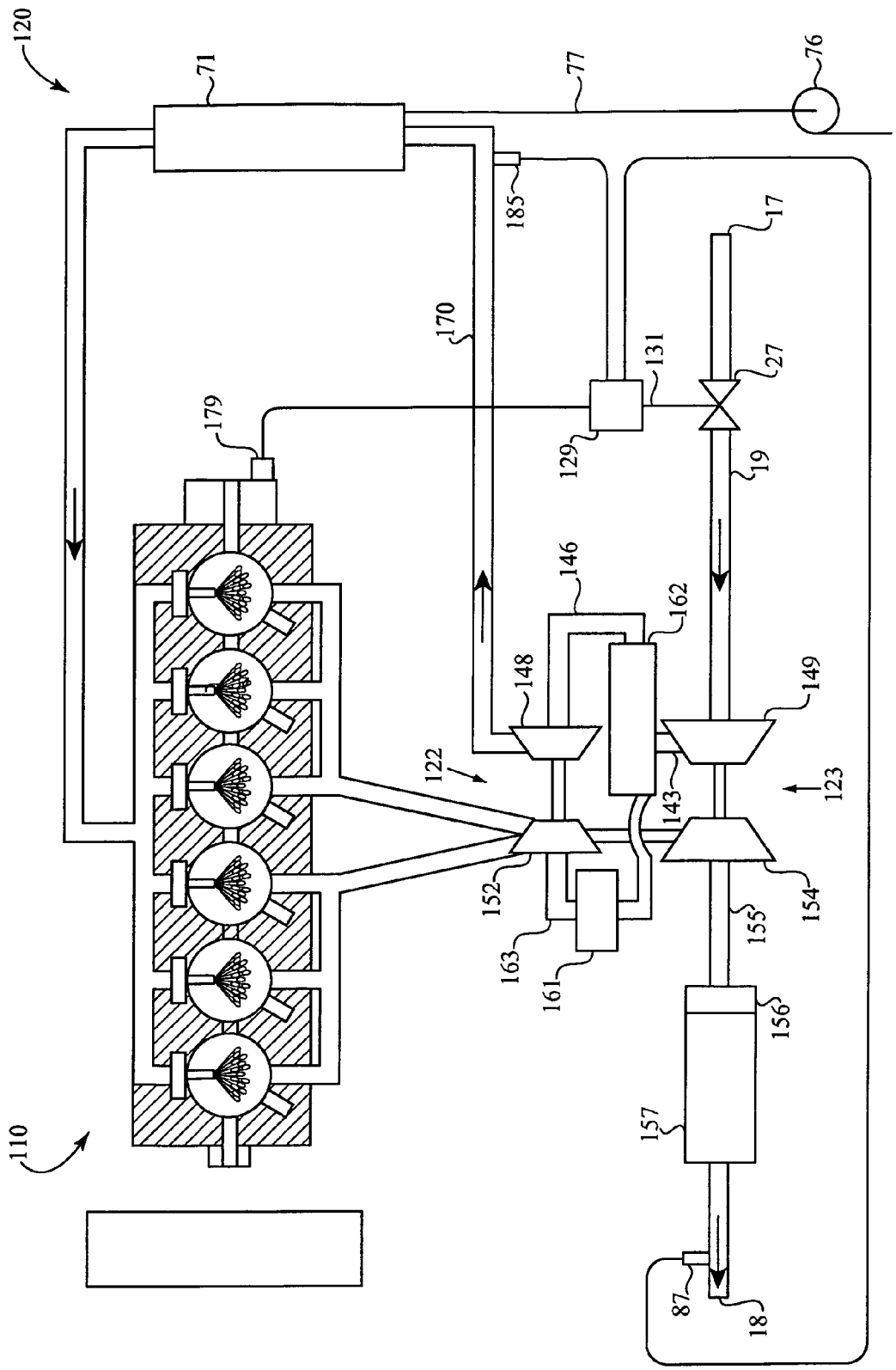
FIG. 2 is a second embodiment of an engine schematic according to the present disclosure.
Figure 3:
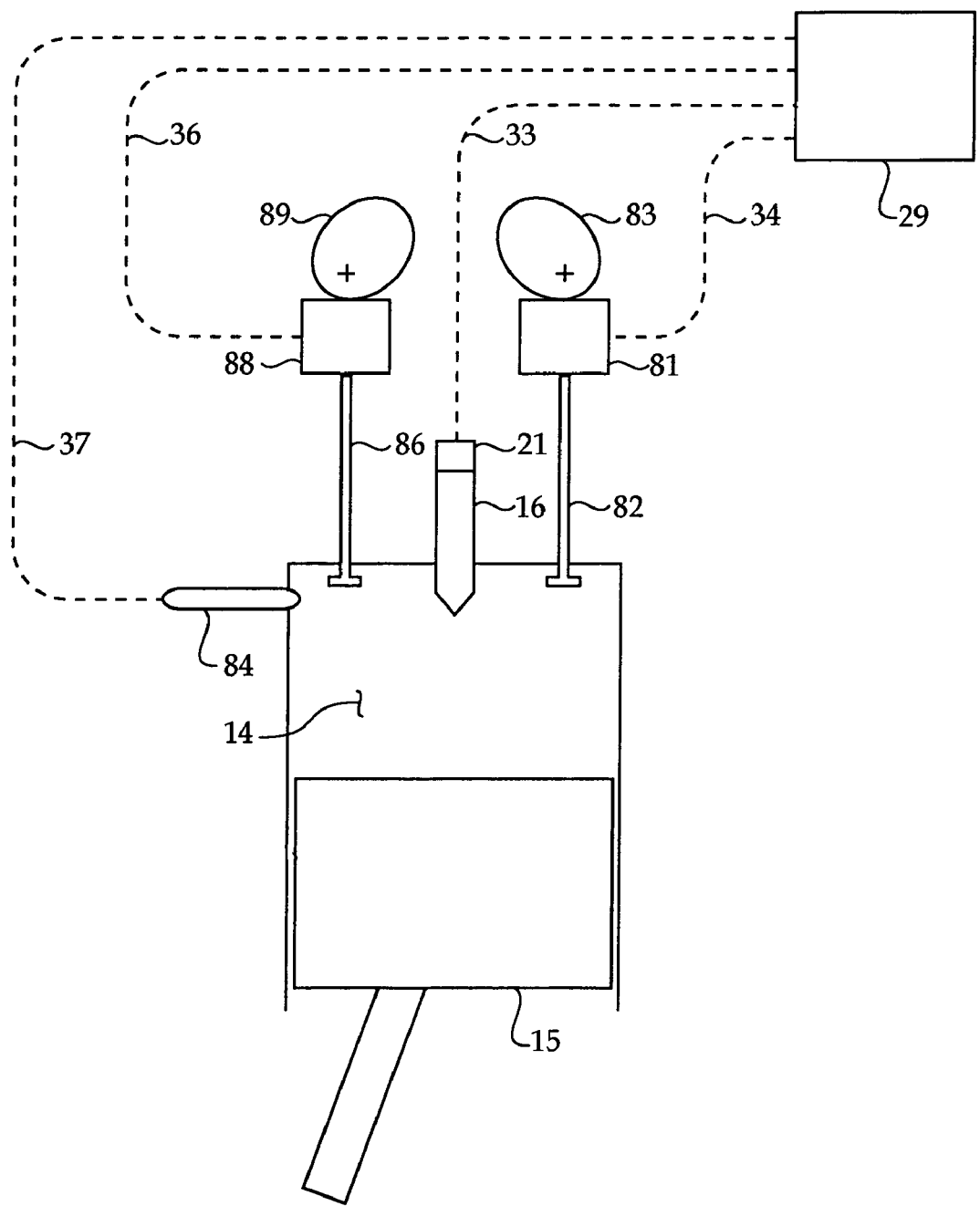
FIG. 3 is a schematic view of an individual combustion chamber for the engine of FIGS. 1 and 2.

Referring now to FIG. 2, a homogeneous charge compression ignition engine 110 is shown with many features that are identical to engine 10 described earlier. However, the exhaust gas recirculation system 120 includes several differences relative to the exhaust gas recirculation system 20 described in relation to engine 10. In particular, while exhaust gas recirculation system 120 includes a pair of staged turbochargers 122 and 123 in series, there is only a single medium pressure exhaust gas recirculation 163 rather than the separate high and low pressure exhaust gas return passages associated with engine 10. In exhaust gas recirculation passage 120, the exhaust gas is supplied to turbine 152 of turbocharger 122 and the medium pressure exhaust gas exits turbine 152 via an axial passage connected to medium pressure exhaust gas recirculation passage 163, and via a separate inter turbine passage 153 that connects to turbine 154 of turbocharger 123. The low pressure exhaust then exits turbine 154, which may be an axial turbine, and empties into turbine outlet 155 before passing through a coated diesel particulate filter 157. As in the previous embodiment, the particulate filter 157 may include any suitable catalyst coating and may include any auxiliary regeneration device 156 that generates the heat necessary to regenerate particulate filter 157. After traversing particulate filter 157, the exhaust gas passes a NOx/lambda sensor 187 on its way out of the tail pipe 18.

The medium pressure exhaust exiting turbine 152 into medium pressure exhaust recirculation passage 163 passes through a coated diesel particulate filter 161 and then enters a clean gas intake inter cooler 162. Meanwhile, fresh air enters at fresh air intake 17 and passes through a throttle control valve 27 into a fresh air supply passage 19. The fresh air is then compressed in compressor 149 of turbocharger 123 before entering air supply passage 143, which merges with medium pressure exhaust gas recirculation passage 163 in cooler 162. Cooler 162 empties into an inter compressor passage 146 that connects to compressor 148 of turbocharger 122. Compressor 148 may include corrosion resistant materials, such as titanium, to better resist any corrosive influence, if any, from the exhaust gas being recirculated. The compressed mixture of exhaust gas and fresh air leaves turbocharger 148 and enters exhaust gas recirculation passage 170, where it passes a lambda sensor 185 on its way to the engine intake passage via an air to air after cooler similar to that described with regard to the previous embodiment. As in the previous embodiment, throttle control valve 27 is controlled via electronic engine controller 129 via a communication line 131. Thus, the exhaust gas recirculation system 120 of the embodiment of FIG. 2 is simplified over that of the embodiment of FIG. 1 in that the ratios of exhaust gas to fresh air is controlled entirely by appropriately positioning throttle control valve 27, rather than by utilizing three valves as in the previous embodiment.

Those skilled in the art will appreciate that HCCI operation is very sensitive to air/fuel ratio charge mass and compression ratio. As a consequence, a slight difference in any one of the air/fuel ratio, charge mass or compression ratio between two different cylinders can result in substantial differences in both combustion phase timing and combustion heat release. Small variations in air/fuel ratio and/or charge mass can have a variety of sources. For instance, geometry of the air intake manifold as well as the position of the individual cylinder with respect to that manifold can affect small differences among different cylinders in the amount of air (and exhaust from EGR) that reaches that individual cylinder. In addition, less than thoroughly mixed exhaust gas with fresh air can also alter conditions in a specific cylinder. Another possible source of variation in air/fuel ratio and/or charge mass can be attributed to performance variations among different fuel injectors. For instance, the same control signal delivered to a plurality of different fuel injectors will inherently result in slightly different amounts of fuel being injected by the different fuel injectors. Better or worse spray atomization may also contribute to variations in individual cylinder performance. In any event, without any adjustments among the plurality of engine cylinders 14, there will be variations in combustion phase timing and combustion heat release. Although not readily apparent, the cylinder with the most advanced combustion phase timing can limit the overall load range of the entire engine. As load increases, this early firing cylinder will eventually cause pressure limits and/or pressure rise rate limits in that individual cylinder to be exceeded before that of the others. In addition, variations in combustion phase timing and combustion heat release can also lead to ever increasing amounts of vibrations and noise as engine load increases.

Thus, those skilled in the art will recognize that inherent variations among different engine cylinders 14 will otherwise limit the load range of the entire engine unless some measure is taken to balance or reduce variations in combustion phase timing and/or combustion heat release among the engine cylinders.

Referring now to FIGS. 3 and 4a-d, a typical engine cylinder 14 for the engines 10 and 110 of FIGS. 1 and 2 is illustrated. Cylinder 14 includes a reciprocating piston 15 and an electronically controlled fuel injector 16 positioned for injection of liquid fuel directly into cylinder 14. Fuel injector 16 includes an electrical actuator 21 operable to control fuel injection quantity from fuel injector 16 via control signals transmitted from engine controller 29 via communication line 33. The engine controller 29 is configured to make independent adjustments in fuel injection quantity to individual cylinders 14 via different control signals communicated to different fuel injectors 16 associated with the different cylinders 14. As used in the present disclosure, fuel injectors 16 can be thought of as combustion heat release controllers. In other words, by adjusting individual signals to individual fuel injectors 16, the fuel injectors can be adjusted in their fuel injection quantity to result in less variation in combustion heat release among all of the engine cylinders 14. For instance, a cylinder with a higher than average combustion heat release, as determined by combustion sensor(s) 84, may have its variation reduced by altering its control signal to slightly reduce the quantity of fuel that the fuel injector 16 for that individual cylinder 14 injects. Those skilled in the art will appreciate that engine controller 29 may be configured to have a closed loop control strategy for continuously adjusting combustion heat release whenever the engine 10, 110 is in operation. Nevertheless, those skilled in the art will appreciate that the present disclosure also contemplates a non-closed loop strategy where the individual control signal adjustments to the various cylinders are preset, and may be updated on some periodic bases, such as at each engine startup or during routine servicing intervals.

In closed loop operation, the engine controller 29 determines a combustion heat release for combustion in the different engine cylinders 14 in one engine cycle, and then determines which of the engine cylinders are in need of having their combustion heat release adjusted to reduce variation. If a cylinder is in need of adjustment, the engine controller 29 will determine a fuel injector control signal adjustment that will either increase or decrease the combustion heat release for that individual cylinder 14. In the illustrated embodiment, determination of combustion heat release is accomplished by individual combustion sensors 84 associated with each individual cylinder 14 that communicate information to engine controller 29 via communication lines 37. In the illustrated embodiment, combustion sensor(s) 84 is a pressure sensor, but those skilled in the art will appreciate that other sensors, such as ion sensors, or any suitable strategy known in the art that can be utilized to estimate combustion heat release for an individual cylinder could be utilized. In the present disclosure, each individual cylinder 14 includes its own combustion sensor 84. However, the present disclosure also contemplates strategies where each individual cylinder includes more than one sensor to determine combustion characteristics, or a strategy that includes a number of sensors less than the number of engine cylinders, but still able to determine individual combustion characteristics sufficient to carry out the control strategy of the present disclosure.

Figure 4:
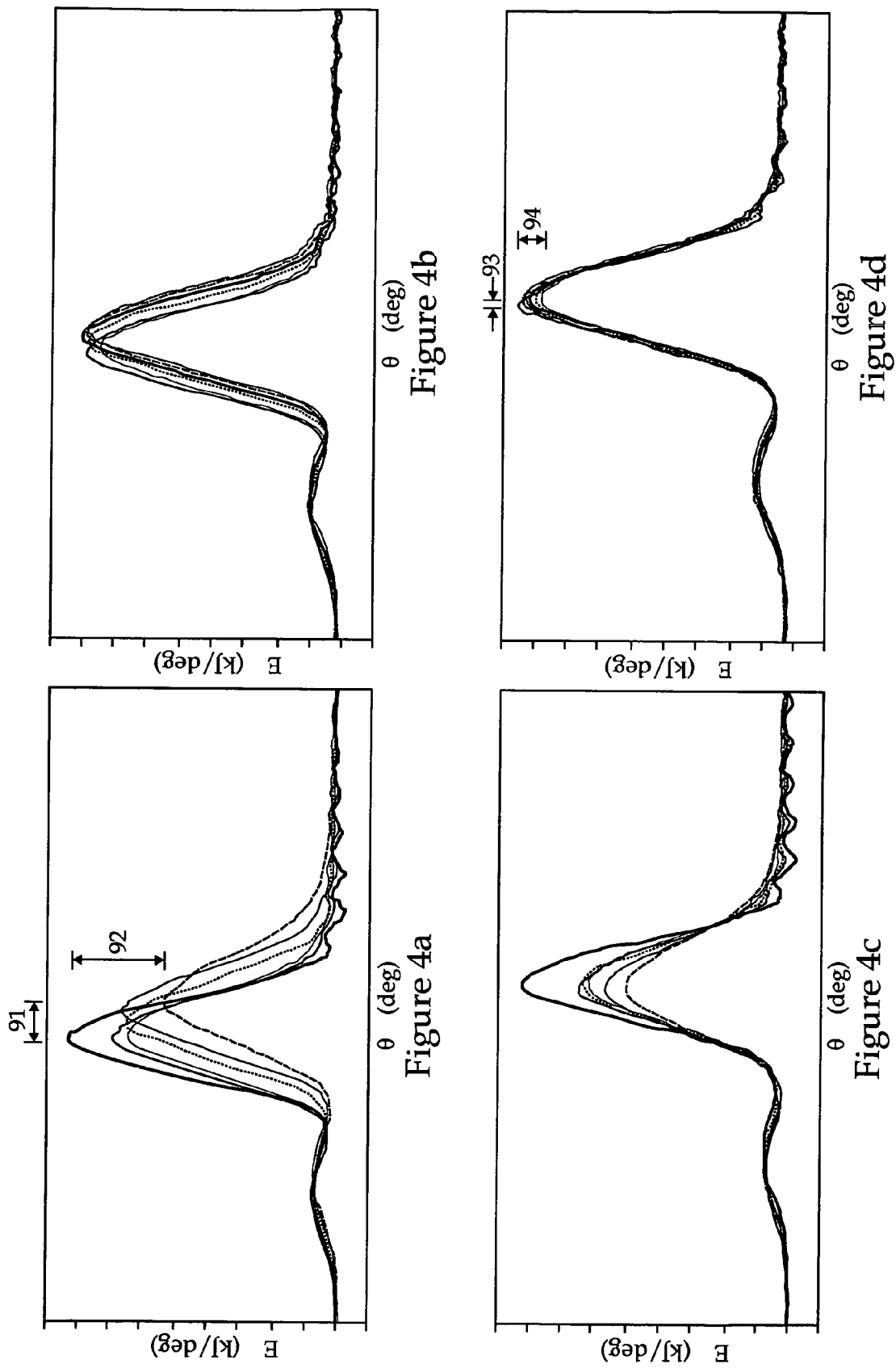
FIGS. 4a-4d are graphs of heat release verses engine crank angle for the engine of FIG. 1 or 2 before any trimming, with fuel trims, with intake valve trims and with both fuel and intake valve trims, respectively.

Depending upon the desired sophistication and possibly the speed of engine controller 29, combustion heat release can be estimated in a number of ways. A general equation for the apparent heat release rate may be expressed as:

$$dQ = rPdV + 1Vdp$$

$$dtr - 1 dtr - 1\, dt$$

where:
r=ratio of specific heats
P=pressure at time t
V=instantaneous combustion chamber volume For instance, a simple numerical integration strategy could be utilized on the entire equation over the combustion duration. Alternatively, an adequate estimation of combustion energy release can be obtained with less intensive processing by recognizing that the dv/dt term in the equation may be ignored if HCCI combustion occurs near top dead center. Those skilled in the art recognize that the combustion chamber volume changes very little in the brief time it takes for the charge to burn around TDC, making the dp/dt term the dominant influence on combustion heat release. In one insightful alternative, even numerical integration can be avoided by recognizing that the maximum dQ/dt in the above equation correlates directly to the total Q or heat release. Thus, if one cylinder shows a maximum dQ/dt that is high, the control signal to that fuel injector would be shortened to decrease the quantity of fuel in order to decrease the maximum dQ/dt and hence the total heat release. Likewise, if the maximum dQ/dt for an individual cylinder is low, the control signal to the fuel injector for that signal would be lengthened to increase the quantity of fuel, increase the maximum dQ/dt and hence bring the total heat release for that cylinder into balance with the other cylinders. Thus, any level of sophistication can be applied to estimate combustion heat release, provided that strategy allows engine controller 29 to determine variation among the cylinders in combustion energy release with sufficient accuracy to adjust control signals to the individual fuel injectors 16 accordingly. Thus, in closed loop operation, the variation among the individual cylinders in combustion energy release can be decreased to a point that the variation is acceptable. This aspect of the disclosure is illustrated in FIGS. 4a and 4b. The combustion energy release variation 92 shown in FIG. 4a before any control signal adjustments can be compared with the relatively smaller variation 94 shown in FIG. 4b after the fuel injector control signals for the individual cylinders 16 have been adjusted. Those skilled in the art will appreciate that the fuel injector control signals can be adjusted toward an average of the cylinders or toward some predetermined combustion energy release for that specific operating condition of engine 10, 110, or possibly toward some other target.

Apart from reducing variations among the individual cylinders in combustion energy release, engines 10 and 110 may also include a means for individually adjusting combustion phase timing in the individual cylinders 14. Thus, the present disclosure contemplates individual combustion phase controllers associated with each of the individual cylinders 14. In the illustrated embodiment, these combustion phase controllers take the form of variable intake valve actuators 81 that allow for the intake valve 82 to be held open beyond a cam dictated closing timing determined by the lobe position of cam 83. Combustion phase timing control may also be accomplished in whole or in part with a variable exhaust valve actuator 88 associated with exhaust valve 86 and cam 89. Although the present disclosure illustrates variable valve timing via valve actuators that work in conjunction with cams 83 and 89, those skilled in the art will appreciate that either the intake and/or exhaust may be totally electronically controlled, such as via electro-hydraulic actuators of the type known in the art. In the illustrated embodiment, the variable intake valve actuators 81 are controlled by engine controller 29 via communication lines 34, and variable exhaust valve actuators 88 are controlled via communication lines 36. Thus, by adjusting individual control signals to one or both of the variable valve actuators 81 and 88, the amount of gas received in that cylinder 14 can be adjusted to adjust the charge mass. This in turn adjusts the air fuel ratio as well as the pressure and temperature at TDC in that individual cylinder 16, and hence the combustion phase timing in that cylinder. In addition, combustion phasing is controlled by compression ratios which is determined by the ratio of cylinder volume when the valve(s) close to cylinder volume at top dead center.

Combustion phase timing can be based upon any suitable combustion characteristic, such as maximum dp/dt or maximum pressure. The illustrated embodiment identifies combustion phase timing at the inflection point of the pressure versus time trace reflected by maximum dp/dt. Thus, the same combustion sensor 84 may be utilized to determine combustion phase timing for an individual cylinder 14 by determining the timing at which the peak cylinder pressure rise rate occurs. This information can then be utilized, and a comparison between all of the engine cylinders can be performed. Any variation among the cylinders can be reduced by adjusting individual variable valve actuators 81 and/or 88 for that cylinder in a subsequent engine cycle. Nevertheless, those skilled in the art will appreciate that a separate different sensor could be utilized for determining combustion phase timing determination apart from the pressure sensor 84 illustrated. In the event that combustion phase timing is adjusted using only the variable intake valve actuator 81, closing the intake valve 82 later in an engine cycle will reduce charge mass and compression ratio, which will retard combustion phase timing. On the other hand, closing the intake valve 82 earlier in the engine cycle will increase charge mass and compression ratio, which will advance combustion phase timing. FIGS. 4a and 4c are useful in illustrating this concept. In the case of FIG. 4a, the combustion phase timing variation 91 is relatively large, but after the individual cylinders have been trimmed by adjusting individual control signals to the respective variable intake valve actuators 81, the variance is reduced as shown in FIG. 4c to a small phase timing variation 93. FIG. 4d is of interest for showing the combustion heat release traces after both the combustion phase timing and combustion heat release magnitude variations have been reduced via appropriate control signal adjustments as discussed above.

Figure 5:
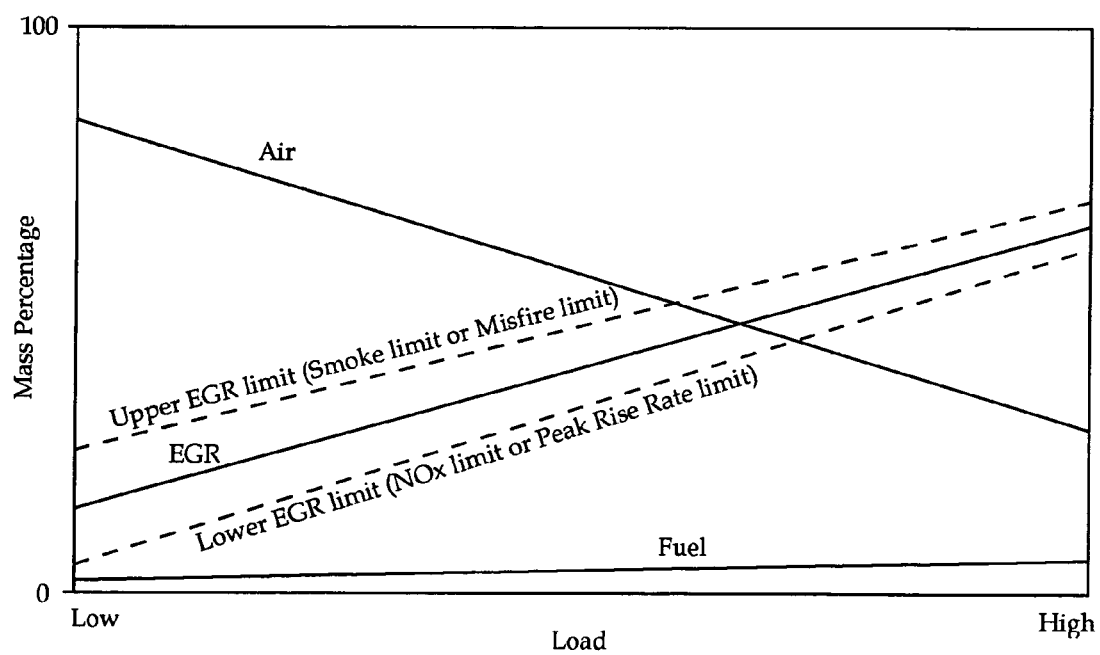
FIG. 5 is a graph of charge mass percentage of air, exhaust and fuel, respectively, verses load according to one aspect of the present disclosure.

Depending upon the specific structure and actuators, each engine 10, 110 according to present disclosure can be thought of as including an exhaust gas return rate control system. In the case of engine 10, the exhaust gas return rate control system includes control valves 26, 27 and 28 as well as possibly some known structure and mechanism (not shown) for controlling boost pressure in a known manner. On the other hand the engine 110 may have its exhaust gas return rate control system constituted by control over turbochargers 122 and 123 to control boost pressure in a conventional manner as well as throttle control valve 27. Referring now to FIG. 5, a graph of mass percentage of exhaust gas, air and fuel is illustrated across the load range for engine 10, 110. As can be seen, the mass percentage of exhaust to air is relatively low at a low load range and actually is greater than the mass quantity of air at higher load ranges. In fact, the EGR rate may be in excess of 50% at the highest load operating ranges. Those skilled in the art will appreciate that the available EGR rates are practically limited on the top side by a smoke limit and/or a misfire limit, and on the lower side by a NOx limit and/or peak rise rate limit. Those skilled in the art will appreciate that increasing EGR rates can eventually lead to a point where the combustion event can be starved of air, thereby producing smoke. In addition, even higher EGR rates can actually cause a misfire. Thus, with all other things being equal, increasing an EGR rate will retard combustion timing, and increase the combustion duration, whereas a reduction in EGR will advance ignition timing, and reduce the combustion duration. The misfire limit typically comes more into play at low loads, whereas the smoke limit will typically come more into play at higher loads. Those skilled in the art will also appreciate that the peak rise rate of combustion is substantially affected by the amount of diluent or exhaust gas in the engine cylinder 14. Additional exhaust gas percentage will generally reduce peak combustion pressure, reduce the pressure rise rate and retard combustion phase timing for the combustion event, as well as extending the duration of the combustion event. Decreased exhaust gas percentage will generally increase peak combustion pressure, increase the pressure rise rate, advance combustion phase timing, and shorten the duration of the combustion event. Those skilled in the art will also appreciate that the EGR rate affects the NOx level of the combustion event. Generally, the exhaust gas acts as a heat sink and therefore cooler combustion and hence less NOx will be produced at elevated levels of exhaust gas in the cylinder. Those skilled in the art will thus realize that a variety of different considerations must be taken into account before setting the exhaust gas return rate at each individual operating condition. However, one can expect the exhaust gas rate settings to vary substantially at different speeds and loads in order to achieve overall acceptable operation with the best mixture of undesirable emissions, which includes NOx, particulate matter and hydrocarbons.

Figure 6:
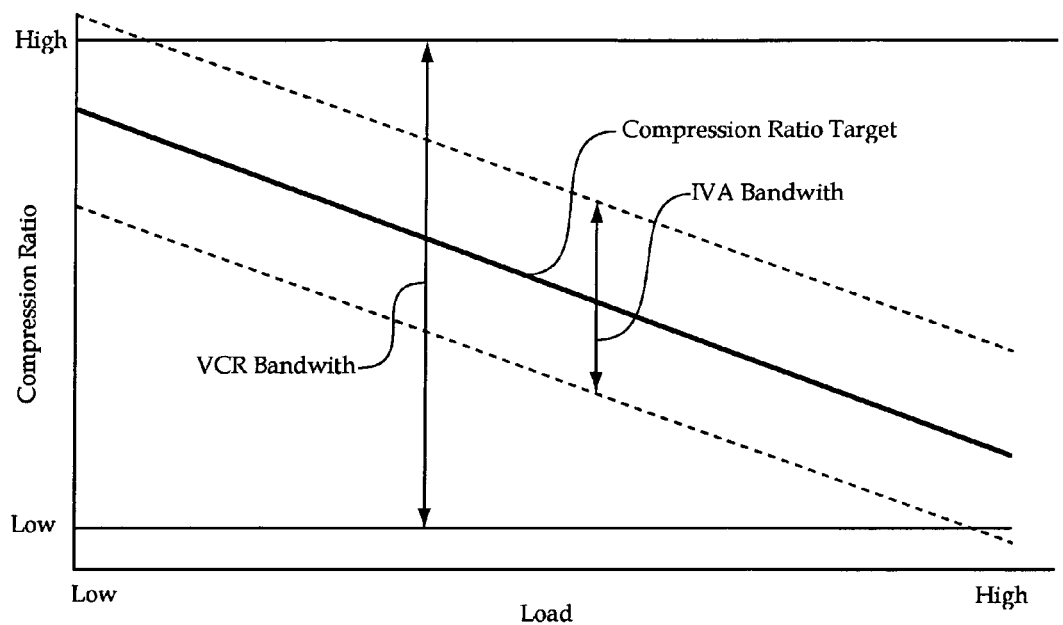
FIG. 6 is a graph of compression ratio verses load showing an available control bandwidth for both a geometric compression ratio controller and a variable valve compression ratio controller.

Referring now to FIG. 6, although the geometric variable compression ratio control device 80 may have a relatively large bandwidth, the majority of that bandwidth will be taken up over the load range of the engine. This aspect of the disclosure illustrated by the downward sloping diagonal line indicated as a geometric compression ratio setting. At lower loads, it may be desirable to operate at a relatively high geometric compression ratio in order to better avoid misfires and promote better operation of the engine with regard to emissions. On the other hand, at higher loads it may be desirable to operate at the lower end of the geometric compression ratio bandwidth. At high loads, the problems associated with controlling combustion ignition timing, pressure rise rates, peak cylinder pressure all become simultaneously more problematic. However, lower compression ratios at higher loads can serve to make all of these problems more manageable. Depending upon the specific engine geometry, the desired geometric compression ratio at low loads may be as much as double or more than the desired geometric compression ratio at the highest load range for the engine. Thus, the compression ratio control system for the HCCI engine must have a substantial range of capabilities in order to allow the engine to operate across a wide load range. Those skilled in the art will appreciate that virtually all aspects of the operation of a homogenous charge compression ignition engine become more acute at higher loads.

FIG. 6 is also of interest for showing that the variable intake valve actuator (IVA) permits a bandwidth of control about the geometric compression ratio setting. Thus, the variable intake valve actuator 81 can be relied upon for quick changes in compression ratio from cycle to cycle and also to trim variations among individual cylinders as discussed above. Thus, in the short term when load changes, the compression ratio target will be primarily changed quickly by adjustments to the variable intake valve actuators 81, but in the longer term the compression ratio target may preferably be met by adjusting the geometric compression ratio via device 80 as discussed above. Those skilled in the art will appreciate that, depending upon the specific structure and control features of an HCCI engine, other short term and long term strategies could be utilized to satisfy the compression ratio target as illustrated in FIG. 6. For instance, another HCCI engine might be equipped with variable geometric compression ratio controllers individually associated with each of the individual cylinders, and those actuators may have a quick enough response time to take the place of the en banc geometric compression controller 80 and variable intake valve actuators 81 or the engines 10, 110 illustrated in FIGS. 1 and 2. In other words, the same compression ratio control features may be used for both trimming combustion phase timing among the individual cylinders, and also for controlling the engines to arrive at a combustion ratio target at each different speed and load across the engine's operating range. These other strategies are within the contemplated scope of the present disclosure.

Because of the great complexities in operating an HCCI engine, especially at higher loads, it may be desirable to predetermine geometric compression ratio and exhaust gas return rates at each speed and load. These predetermined settings would each correspond to an acceptable mixture of performance, emissions and other concerns at each speed and load across the engine's operating range. These settings may be saved as respective geometric compression ratio controller settings and exhaust gas return rate controller settings that are mapped as a function of speed and load, and available on a medium linked to the electronic engine controller 29. Even with these premapped settings, it may be desirable to have closed loop control on at least one of the exhaust gas return controller system and the geometric compression ratio controller system. For instance, the lambda sensor 85, which is positioned downstream from the exhaust gas return rate controller system, allows for the engine controller 29 to confirm the exhaust gas ratio actually being supplied to the engine corresponds to what engine controller 29 believes that rate is or should be. This affords the ability to adjust the controller settings in order to achieve a return rate at a desired level, rather than operating in an open loop fashion. Likewise, the geometric compression ratio sensor 79 allows for the engine to confirm, and possibly adjust signals to, the geometric compression ratio control system 80 to make the engine configuration better correspond to the predetermined maps and/or the expected compression ratio.

INDUSTRIAL APPLICABILITY

Those skilled in the art will recognize that, unlike conventional diesel engines, homogenous charge compression ignition engines may require substantially larger amounts of EGR in order to better facilitate operation across a broad range of speeds and loads of the engine. In fact, these EGR rates may exceed 50% of the gas being supplied to the intake of the engine. These extremely high levels of exhaust gas recirculation are typically not available in exhaust gas recirculation systems associated with conventional diesel engines. Thus, when engines 10 and 110 are operating in the highest portions of there load ranges, increased proportions of exhaust gas are supplied in the recirculation systems 20, 120 by throttling the fresh air intake valves 27 in order to promote the higher EGR levels. In the case of engine 10 at lower speeds and loads, throttle control valve 27 may be positioned in a fully opened condition, whereas the relative proportions of desired EGR are maintained by appropriately positioning control valves 26 and 28 associated with the low and high pressure exhaust gas passages, respectively. On the other hand, the engine of 110 controls the relative proportions of exhaust gas to fresh air by adjusting the position of throttle control valve 27 across the engine's operating range.

Those skilled in the art will appreciate that exhaust gas can be useful in manipulating ignition timing and both the maximum pressure and pressure rise rates of a combustion event in a homogenous charge compression ignition engine. Because the chemical constituents of the exhaust typically are of higher heat capacity than those of pure air, increasing the percentage of inducted exhaust gas can serve as a heat sink to absorb combustion energy that might otherwise result in an extreme pressure spike and higher combustion temperatures. Thus, elevated levels of exhaust gas can reduce peak cylinder pressure and cylinder pressure rise rates, by slowing the combustion rate and retard ignition timing, which will allow for operation at ever higher loads. With all other things being equal, an increased percentage of inducted exhaust in the cylinder will also allow for an increased compression ratio for a given combustion phasing and vice versa. Thus, increased amounts of EGR can be used to retard ignition timing, whereas reduced EGR rates can be utilized to advance ignition timing. Thus, varying amounts of exhaust gas recirculation coupled with a variable compression ratio device and/or the variable intake valve actuator can provide three useful control levers for adjusting ignition timing and maximum cylinder pressure across a wide range of operating conditions.

Those skilled in the art will also appreciate that some attention should be paid to balancing the desire to boost intake pressure by extracting energy from the exhaust gases via turbocharger(s), verses routing exhaust gas for recirculation prior to extracting all of the potential energy therefrom. This issue is addressed in the engines 10 and 110 by including staged turbochargers 122 and 123 in series with one another. However, the present disclosure contemplates a single turbocharger for the engine or possibly two or more turbochargers in series and/or parallel with an appropriate arrangement that allows for sufficient intake boost pressure while allowing for increased exhaust gas recirculation rates associated with homogeneous charge compression ignition operation at higher speeds and loads. Those skilled in the art will appreciate that all of the strategies disclosed above for varying cylinder pressures and cylinder pressure rise rates are closely coupled. Thus, one might wish to rely largely on the geometric compression ratio device 80 for bulk changes in compression ratio, rely upon varying amounts of EGR to adjust ignition timing, and may rely upon variable intake valve actuator for quick adjustments from cycle to cycle and to adjust for differences among the cylinders in their behavior. Nevertheless, the control inputs can be mixed and utilized as desired to achieve a desired response time and arrive at a new operating condition with sufficient control capabilities available to operate the engine in any desired fashion.

In order to extend the operating range of engine 10, 110 into higher load ranges, it may be necessary to reduce variations among the engine cylinders 14 in at least one of combustion phase timing and combustion energy release. Those skilled in the art will appreciate that the maximum load capability for an engine occurs when at least one of the engine cylinders produces a peak cylinder pressure at or above some predetermined threshold associated with the containment capabilities of the engine housing (e.g., engine block and engine head, etc.). In addition, peak pressure rise rates may be more of a limiting factor than peak pressure due to concerns over vibrations. By adjusting combustion phase timing, the variation among the individual cylinders 14 can be reduced and the load range extended since all of the cylinders will approach the peak cylinder pressure and pressure rise rate limit more in unison rather than one early firing cylinder reaching its limit at a lower load condition. The load range of engine 10, 110 is also extended by adjusting control signals to individual fuel injectors 16 to reduce variations among the engine cylinders with respect to combustion energy release. Thus, if one cylinder has a higher than average combustion energy release, its fuel injector control signal would be shortened toward a direction of injecting slightly less fuel, whereas a cylinder with a low combustion energy release would have its fuel injector control signal extended to inject slightly more fuel. By power balancing the cylinders, the sound and vibration emissions from the engine can be reduced, especially at higher loads, and the entire engine can be operated at higher loads than that realistically practical or possible with unbalanced cylinders.

In the illustrated embodiment, the maximum load range capability of the engine is maintained throughout its operation by operating the combustion phase timing variation reduction strategy and the combustion energy release variation strategy in a closed loop fashion in the background of the engine operation control. Thus, one could expect the control signals to the fuel injectors 16 and variable intake valve actuators 18, 81 to the individual cylinders 14 to constantly be adjusted to compensate for variations in the combustion phase timing and combustion energy release among the engine cylinders due to inherent factors associated with the engine, and other factors. For instance, inherent variations in the fuel injectors can be compensated for as well as variations resulting from intake manifold geometry. However, by continuously operating the variation reduction algorithm in the background, other sources of variation in combustion phase timing and combustion energy release, such as fresh air pressure, fresh air temperature, engine temperature, EGR temperature and the like can also be compensated for.

Setting up a homogeneous charge compression ignition engine can be accomplished by identifying a combination of compression ratio and exhaust gas percentage that satisfy a pressure rise rate limit and a peak cylinder pressure limit for the engine structure. In order to reduce the number of variables involved, this aspect of the disclosure can be carried out utilizing a single cylinder test engine. However, fully carrying out an identifying process in this regard on a multi cylinder engine may necessarily be accomplished better after the cylinders have been balanced for a combustion energy release and for variations in combustion phase timing. Thus, by utilizing a single cylinder engine for this identification process, some of the complexity in variation can be removed. Thus, one should identify a compression ratio and exhaust gas percentage at each speed and load, and then convert the compression ratio and exhaust gas percentages into controller settings for the specific engine. For instance, the compression ratios identified may correspond to geometric compression ratio settings, whereas the exhaust gas percentages would correspond to different settings of the control valves associated with the exhaust gas return system. These settings could then be mapped against speed and load, and the map stored on a medium linked to the electronic engine controller 29. Thus, when the controller determined at what speed and load operation should be maintained, the look up table map would provide settings both for the geometric compression ratio controller system and the exhaust gas controller system. Sensors could allow the controllers to be fine tuned in a closed loop fashion to precisely represent these desired values, or they may be set in an open loop manner. Because of the subtleties of operation, it may be desirable to have closed loop control over the exhaust gas return rate settings, whereas open loop control may better suffice with regard to geometric compression ratio controller. When employing these settings then in a multi cylinder engine, the electronic engine controller should be configured to balance combustion phasing, and possibly combustion energy release among the plurality of engine cylinders so that any imbalance is reduced. In other words, without balanced cylinders, an uncorrected imbalance alone can limit high load operation even if appropriate settings are otherwise available. As stated earlier, this is because one cylinder will arrive at peak cylinder pressure limit or peak cylinder pressure rise rate limits prior to the rest.

Generally, these settings may be arrived at by first finding an exhaust gas percentage that achieves a desired NOx level output from the engine while also satisfying a peak rise rate limit and avoiding either a smoke or misfire limit as shown in FIG. 5. Next, a compression ratio is identified at that exhaust gas percentage that results in a desired combustion phasing. Those skilled in the art will appreciate that reducing geometric compression ratio retards ignition timing, and increasing geometric compression ratio generally advances combustion phasing. Because virtually all settings have an interrelated effect, the desired settings may be arrived at in an iterative manner. Thus, one may wish to go back and readjust the exhaust gas return rate setting to readjust the NOx level to a desired state. Next, the geometric compression ratio can again be adjusted to fine tune combustion phasing, given the exhaust gas return rate setting. This iterative process may continue at each speed and load until the engine operates in a desired fashion and produces a mixture of acceptable levels of emissions, including NOx, unburnt hydrocarbons and particulate matter. Nevertheless, those skilled in the art will appreciate that the higher load ranges almost necessarily require that the combustion balancing previously discussed to be put in effect. Thus, those skilled in the art will appreciate that identifying compression ratio and exhaust gas return rate settings using this methodology can be quite cumbersome when finding an appropriate recipe at each speed and load across an engines operating range. However, these predetermined settings allow the controller to always know where it should be, and leave the finer quick control aspects of the engine to the variable valve actuators that would require individual control signals for each one of the cylinders.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A method of setting up a homogenous charge compression ignition engine, comprising the steps of:
   identifying a combination of compression ratio and exhaust gas percentage that satisfy a pressure rise rate limit and a peak cylinder pressure limit;
   performing the identifying step across an engine operating range at a plurality of combinations of speed and load; and
   mapping the identified combinations of compression ratio and exhaust gas percentage to combinations of speed and load; and
   storing the mapping on a medium linked to an electronic engine controller.

2. The method of claim 1 including a step of configuring the electronic engine controller to balance combustion phasing among a plurality of engine cylinders via control of individual gas exchange valve timing controls of individual combustion chambers.

3. The method of claim 1 including a step of configuring the electronic engine controller to balance combustion heat release among a plurality of engine cylinders via control of individual fuel injectors of individual combustion chambers.

4. The method of claim 3 including a step of configuring the electronic engine controller to close loop control exhaust gas percentage via an exhaust sensor downstream from an exhaust gas recirculation controller.

5. A method of operating an engine, comprising the steps of:
   compressing a mixture of fuel, exhaust gas and air in a combustion chamber to an autoignition condition of the fuel;
   setting an exhaust gas recirculation rate sufficient to achieve a NOx level;
   setting geometric compression ratio corresponding to a combustion phasing, given the exhaust gas recirculation rate setting; and
   making different gas exchange valve timing control settings among a plurality of combustion chambers.

6. The method of claim 5 wherein the making step includes a step of balancing combustion phasing among the plurality of combustion chambers.

7. The method of claim 5 including a step of linking a control map of exhaust gas recirculation rate settings for each combination of speed and load to an electronic engine controller.

8. The method of claim 5 wherein the exhaust gas recirculation rate setting at each engine load is less than a smoke limit, but sufficient to satisfy a combustion pressure rise rate limit.

9. The method of claim 8 including a step of sensing exhaust gas in the exhaust gas recirculation system down stream from an exhaust gas recirculation controller; and
   adjusting the exhaust gas controller based upon the exhaust gas recirculation rate setting and the sensed exhaust gas.

10. The method of claim 5 including a step of sensing geometric compression ratio; and
    adjusting a geometric compression ratio controller based upon the exhaust gas recirculation rate setting and the sensed geometric compression ratio.

11. The method of claim 10 wherein the exhaust gas recirculation rate setting at each engine load is less than a smoke limit, but sufficient to satisfy a combustion pressure rise rate limit.

12. The method of claim 11 including a step of sensing exhaust gas in the exhaust gas recirculation system down stream from an exhaust gas recirculation controller; and
    adjusting the exhaust gas controller based upon the exhaust gas recirculation rate setting and the sensed exhaust gas.

13. The method of claim 5 including a step of linking a control map of geometric compression ratio settings for each combination of speed and load to an electronic engine controller.

14. The method of claim 13 including a step of linking a control map of exhaust gas recirculation rate settings for each combination of speed and load to an electronic engine controller.

15. The method of claim 14 wherein the making step includes a step of balancing combustion phasing among the plurality of combustion chambers.

16. A homogeneous charge compression ignition engine comprising:

an engine housing having at least one combustion chamber disposed therein;

an exhaust gas recirculation rate control system with a range of settings sufficient to achieve a NOx level at each engine operating condition;

a geometric compression ratio control system with a range of settings;

a gas exchange valve timing controller associated with each combustion chamber; and an electronic engine controller linked to a map of exhaust gas recirculation rate controller settings for each speed and load across an operating range; and the electronic engine controller being linked to a map of geometric compression ratio controller settings for each speed and load across the operating range.

17. The engine of claim 16 wherein the exhaust gas recirculation rate control system includes an exhaust gas sensor downstream from exhaust gas recirculation rate controller.

18. The engine of claim 17 wherein the electronic engine controller is configured to adjust the exhaust gas recirculation rate controller based upon the exhaust gas recirculation rate controller settings map and the exhaust gas sensor.

19. The engine of claim 18 wherein the electronic engine controller is configured to balance combustion phasing among a plurality of combustion chambers via the gas exchange valve timing controllers.

20. The engine of claim 19 wherein the electronic engine controller is configured to balance combustion heat release among a plurality of combustion chamber via separate fuel injectors associated with each combustion chamber.

* * * * *